3,028,362
COPOLYMERIZATION OF ACROLEIN WITH AN EPOXY COMPOUND IN THE PRESENCE OF A THIOAMIDE CATALYST, AND PRODUCT OBTAINED THEREBY
Rolf Zimmermann, Wiesbaden, Germany, assignor to Chemische Werke Albert, Wiesbaden-Biebrich, Germany, a corporation of Germany
No Drawing. Filed Feb. 9, 1959, Ser. No. 791,853
Claims priority, application Germany Feb. 12, 1958
13 Claims. (Cl. 260—45.5)

This invention relates to modified acrolein resins and their production.

German Patent 733,099 discloses that acrolein can be converted into polymeric products by mixing it with catalytic quantities of thiourea. Furthermore, German Patent 748,690 describes the conversion of acrolein into resin-like products in the presence of alcohols or phenols and in the presence of catalytic quantities of thiourea to produce resins with improved softening characteristics. However, the polymeric substances produced in accordance with these German patents have not proven to be of practical importance.

Now it has been found that modified and superior acrolein resins, capable of being hardened, are obtained in a smooth reaction, and in almost quantitative yields, by reacting acrolein with compounds containing epoxy groups in the presence of catalytic quantities of thiourea, or like thioamide catalysts.

The resulting novel resins are highly elastic and have superior chemical resistance. When these modified acrolein polymerizates are used as coating materials they dry very readily and render the coated surfaces highly chemically resistant. The obtained resins are clear and bubble-free products which, due to their good mechanical and electrical characteristics, can be used as casting resins. The final hardening of the cast resins occurs without the introduction of additional ingredients and without the necessity for additional processing. The finally hadened resins can be worked mechanically, for instance, by sawing, milling and drilling.

If the acrolein is polymerized with compounds containing epoxy groups in the presence of organic solvents, as for instance, mono alcohols, highly viscous solutions are obtained which may be used in still other fields of application, as for instance, in the production of lacquer resins or lacquers, coating compositions, impregnating compositions, adhesive compositions, and the like. Of course, other known compatible organic lacquer solvents may be used in place of the mono alcohols.

The conversion of the acrolein with the epoxy compounds appears to be a polyadditive reaction in which the epoxy groups are opened up. The reaction is exothermic and the temperature may be as high as 75° C. In some instances, therefore, it is desirable to cool the reaction mass while the reaction is taking place. For example, the temperature may rise in short time to 75° C. so that it becomes desirable to moderate the temperature by cooling the reaction mass to a lower temperature such as 50° C. or lower. It is not necessary to exclude the oxygen of air during the reaction.

The acrolein and the compounds containing the epoxy group may be reacted in widely varying proportion. Any substantial amount of epoxy compound favorably affects the qualities of the acrolein resin. Especially valuable products are obtained when the acrolein and the compound containing the epoxy groups are respectively reacted in weight proportions between 10:1 and 1:1. Where desired, the reaction may be carried only to the point where only part of the epoxy groups are opened up by reaction with acrolein. In this way the remaining epoxy groups are retained and may be utilized to impart different hardening properties to the modified resins.

The speed at which the acrolein and the epoxy compounds form the resin polymerizate depends upon the type and quantity of the epoxy compounds used as well as upon the type of catalyst and its concentration.

Suitable compounds containing epoxy groups are for instance allyl glycidyl ether, phenyl glycidyl ether, alkylphenyl glycidyl ethers, such as tertiary butyl phenyl glycidyl ether, xylenyl glycidyl ether, butanediol diglycidyl ether epichlorhydrin, ethylene oxide, styrene oxide, and epoxy resins. Especially good results are obtained when epoxy resins are used as epoxy reactant modifiers for the acrolein resins such as those obtained, for instance, from polyalcohols or diphenols; especially those obtained from p,p'-dihydroxydiphenyl alkanes, for instance, dihydroxydiphenyldimethylmethane, by reaction with halogen hydrins such as epi- or dichlorohydrin. Known epoxy resin-forming polyhydric alcohols may be used in place of the diphenols such as ethylene glycol, propanediol, butanediol, hexanediol, and the like for reaction with halogenhydrins to form the epoxy resins supplying the epoxy groups serving to favorably modify the acrolein resins. Thus, these epoxy resins are preferably polyglycidyl ethers of polyhydric aliphatic alcohols or polyhydric phenols. It will be understood that epoxy resins, as a class, contain an epoxy group and that these epoxy groups may be used to favorably modify acrolein resins. As stated, however, epoxy resins derived from dihydroxydiphenyl alkanes and particularly those derived from bisphenol have proven especially advantageous.

In place of thiourea, other thioamide catalysts may be used, such as aryl, alkyl, alkylol thioureas; or cyclic thioureas, such as N,N'-ethylene thiourea; or thioamides such as thioacetamide; or thiosemicarbazide, and the like.

In another embodiment of this invention acrolein resins modified with epoxy groups are further modified by carrying out the reaction in the presence of polymerizable vinyl compounds. Since acrolein itself is a vinyl compounds, the conversions of this invention may be carried forward in the presence of desired quantities of known polymerizable vinyl compounds, such as styrene, acrylonitrile, vinyl acetate, vinyl butyrate, vinyl toluene, diallyl phthalate, acrylic acid or methacrylic acid esters, or the like. Customarily, however, the polymerizable vinyl compound, other than acrolein, is present in a lesser quantity, both by weight and by molar proportions, than the quantity of acrolein.

In yet another embodiment of this invention, it may be desirable to modify the nature of the polymerizates of this invention by carrying out the reaction in the presence of compounds containing hydroxy groups, such as those heretofore used in the modification of acrolein resins. Polyols, including various polyhydric alcohols and polyhydroxy phenols, are especially valuable as modifiers of acrolein polymerizates, also modified with epoxy compounds, and if desired, with other vinyl compounds. Such polyols include ethylene glycol, diethylene glycol, butanediol, butylene glycol, butinediol, glycerine, trimethylol propane, or the like, or ethers or esters of polyhydric alcohols which still contain hydroxy groups such as obtained by reacting them with other alcohols or organic acids; or mononuclear or polynuclear polyphenols, especially, p,p'-dihydroxy diphenyl alkanes, or ethers of polyhydroxy phenols formed with polyhydric alcohols which still contain hydroxy groups.

Esters of allyl alcohol with polyvalent carboxylic acids have also proven capable of favorably influencing the modified acrolein resins hereof.

Since excellent resins can be obtained without utilizing polyhydric alcohol modifiers, polyhydric alcohols may be used in the reactions hereof in widely varying proportions but are usually used in lesser quantities than acrolein. Very good results can be obtained by using acrolein and polyhydric alcohol reactants in respective molar ratios between 6:1 and 3:1.

In an important embodiment of this invention the acrolein resins hereof are reacted first with an epoxy compound, or with both epoxy compounds and polyhydric alcohols, or even with a part of a polymerizable vinyl reactant for a period of time only sufficient to convert the polymerizate to an intermediate viscous phase where they are still soluble in conventional polymerizable vinyl compounds and then dissolve the intermediate resin in a polymerizable vinyl compound and complete the conversion. The course of this preliminary reaction can be modified to a certain extent by controlling the exothermically induced reaction temperatures so that they do not rise to a point at which the reaction rapidly goes to completion. Normally the initial reaction mass will still be soluble in conventional polymerizable vinyl compounds if the vinyl compounds are added while the reaction mass is still in a viscous state. In this embodiment of the invention it may be desirable to cool the resin to room temperature before adding the vinyl monomer and an organic solvent diluent, such as a mono alcohol, may be added in order to prevent premature gelation.

These resin compositions, in their intermediate state, provide superior surface coating compositions. They may be rapidly hardened by the addition of known peroxygen catalysts and, if desired, conventional accelerators. For example cyclohexanone peroxide and methyl ethyl ketone peroxide may be used together with conventional accelerators, such as cobalt-naphthenates.

Lacquer films made from these resins in their intermediate state dry within a few minutes and are, after a few hours, completely free of stickiness even when they are used in thick layers. The coated film is clear, or light in color, possesses a high gloss and has exceptionally good adhesive qualities. While the coated films are free of stickiness in a short period of time, they are even harder after a drying for a longer period of time, say a day, and, at that time, they are hard enough to be polished and ground.

As will appear from the illustrative examples, water clear, or transparent, resins can be produced in accordance with this invention although some of them may be slightly colored. Depending on the type and concentration of the reactants very hard resins with good mechanical and electrical characteristics, or elastic rubber-like or highly viscous products may be produced. In all instances, however, the products have exceptionally good adhesiveness and adhere tenaciously to all types of surfaces such as glass, wood, or metal. As the result, the compositions of this invention may be used in many and varied applications. They are quite compatible with a large number of other resins, and, therefore, may be used alone or in admixture with other synthetic resins.

This invention will be further exemplified in the following examples in which the parts are all expressed in parts by weight.

Example 1

Two and five-tenths (2.5) parts of thiourea are dissolved in 150 parts of acrolein. Then the clear solution is mixed with 40 parts of an epoxy resin having a molecular weight of 2,900, a melting point of 125–132° C., and an epoxy equivalent of 1650–2050 as obtained, in a known manner, from p,p'-dihydroxydiphenyldimethylmethane and epichlorohydrin in alkaline solution. The epoxy resin is completely dissolved in the acrolein. After a short period of time heating takes place and the temperature rises to about 70° C. After 2 hours, the viscous reaction mixture is poured into a form. After 24 hours, a hard resin is obtained that can be worked mechanically.

Example 2

A solution of 2 parts of thiourea in 150 parts of acrolein is mixed with 30 parts of an epoxy resin as disclosed in Example 1, 10 parts of p,p'-dihydroxydiphenyldimethylmethane and 5 parts of ethylene glycol. The clear solution heats up in a short period of time. After about 3 hours, the viscous solution is poured into a form. After about 20 hours the casting has hardened. The maximum bending strength is reached in about 3 days.

Example 3

Fifteen (15) parts of allyl glycidyl ether are added to a solution of 1.25 parts of thiosemicarbazide in 75 parts of acrolein. The mixture heats up slowly, becomes gel-like after 3 to 4 hours and solidifies after about 10 hours into a clear hard resin which can be worked by sawing, milling or drilling.

Example 4

A mixture of 220 parts of acrolein and 3.5 parts of phenyl thiourea is mixed with 30 parts of allyl glycidyl ether. The reaction product is obtained in about 48 hours as a clear hard resin with approximately the same characteristics as the resin described in Example 3.

Example 5

Thirty (30) parts of phenyl glycidyl ether are added to a solution of 2.5 parts of ethylene thiourea in 100 parts of acrolein. A rise in temperature up to about 70° C. takes place immediately. After several hours the reaction mixture solidifies into a hard, slightly yellow colored polymerizate which can be worked mechanically.

Example 6

Three (3.0) parts of thiourea are dissolved in 160 parts of acrolein. Then 40 parts of epichlorohydrin are added. After one hour, the solution becomes turbid but gets clear again after an additional hour. After about 48 hours, the solution of the reaction mass has solidified into a slightly yellow colored elastic resin with good mechanical workability.

Example 7

Forty (40) parts of ethylene oxide are dissolved in 100 parts of allyl alcohol by feeding the ethylene oxide into the alcohol until the weight of the solution has increased accordingly. The solution is mixed with a mixture of 120 parts of acrolein and 1.5 parts of thiourea. Strong heating takes place so that it is advantageous to cool the reaction solution. After 1 to 2 hours a viscous resin is obtained which shows good film-forming characteristics and is suitable for the manufacture of surface coatings.

Example 8

Twenty (20) parts of allylglycidyl ether and 10 parts of the bis-(ethylene glycol ether) of p,p'-dihydroxydiphenyl dimethylmethane are added to a solution of 2 parts of thiourea in 100 parts of acrolein. After 12 hours a clear, hard polymerizate is obtained with the characteristics of a good casting resin.

Example 9

Thirty (30) parts epoxy resin, as described in Example 1, and 2 parts of thioacetamide are dissolved in 120 parts of acrolein. Thereafter 10 parts of butylene glycol are added. After a short period of time, the temperature rises to about 60° C. and the mixture becomes more viscous and thereafter a rubber-like, elastic resin forms.

Example 10

One hundred fiifty (150) parts of acrolein, after an addition of 4 parts thiourea, are mixed with 30 parts of allyl glycidyl ether and 20 parts of styrene. Overnight a light, very hard casting resin forms which has a good mechanical workability.

Example 11

Thirty (30) parts of an epoxy resin of the type disclosed in Example 1 are added to a solution of 2 parts of thiourea in 100 parts of acrolein. The temperature rises in a short time to about 65° C. As soon as the mixture of the reaction becomes viscous (semifluid), it is diluted with methanol in the ratio of 1:1. The solution is stable in storage and can be used as lacquer.

Example 12

Thirty (30) parts of phenyl glycidyl ether and 11 parts of adipic acid glycol ester are introduced into a solution of 3 parts of thiourea in 120 parts of acrolein. Also, in this instance, strong exothermic heating takes place and after 24 hours a clear, slightly yellow colored casting resin with good mechanical workability is obtained.

Example 13

Twenty (20) parts of allyl glycidyl ether and 10 parts of vinyl butyrate are introduced into a solution of 1.5 parts of thiosemicarbazide in 50 parts of acrolein. After 24 hours, the reaction mixture becomes gelatinous and, after an additional 48 hours, solidifies into a rubber-like elastic resin.

Example 14

Thirty (30) parts of an epoxy resin of the type disclosed in Example 1 are dissolved in 100 parts of acrolein after a previous addition of 2 parts of thiourea. Then 20 parts of acrylonitrile are added. Only a slight heating takes place and after 3 hours the reaction solution is still semifluid. After about 10 hours the reaction mass solidifies into a viscous (tough) elastic casting resin with good mechanical workability.

Example 15

Eight-tenths (0.8) parts of thiourea are dissolved in 50 parts of acrolein and 10.0 parts of allyl glycidyl ether and 10 parts of hexylene glycol are added. The temperature of the resulting solution rises to 60 to 70° C. After a few hours, a very hard, yellow colored casting resin is obtained.

Example 16

Sixty (60) parts of acrolein, 1 part of thiourea and 15 parts of xylenyl glycidyl ether are mixed and reacted with one another. Only a slow heating takes place. After 3 hours, the reaction mass is gel-like but it solidifies, after a few hours, into a hard polymerizate with the characteristics of a good casting resin.

Example 17

Fifty (50) parts of acrolein are mixed with 1 part of N,N'-ethylene thiourea and 15 parts of tert.-butylphenyl glycidyl ether. Overnight a colorless, clear, hard resin forms.

Example 18

Four hundred (400) parts of acrolein, 5 parts of thiourea, 80 parts of allyl glycidyl ether and 40 parts of ethylene glycol are introduced into a three-necked flask equipped with reflux cooler, stirrer, dropping funnel and thermometer. The temperature rises to 65° C. within 35 minutes. Stirring for another half hour at this temperature is continued, then 50–70 parts of ethanol are added and the reaction mass cooled to 20° C. and the resulting syrupy mixture is mixed with 150 parts of styrene. In order to remove small traces of unconverted acrolein it is appropriate to distill off the added alcohol under a partial vacuum. From the resin solution thus obtained one can, for instance, after an addition of 2% cyclohexanone peroxide (50%) and 2% cobaltnaphthenate (1% Co), cast lacquer films which are dry enough to avoid dust depositing thereon after 20 minutes and can be ground and polished after about 24 hours. The films distinguish themselves by a high gloss and very good adhesiveness.

Example 19

A mixture of 400 parts of acrolein, 10 parts of phenyl thiourea and 80 parts of phenyl glycidyl ether and 40 parts ethylene glycol is reacted as described in Example 18. Also in this case the course of the reaction is exothermic whereby the temperature rises to 60° C. within a few minutes. A highly viscous solution is obtained which is cooled to 20° C. Then 150 parts of vinyl toluol are added. If the highly viscous water-clear resin solution thus obtained is mixed, for instance, with 2% methyl ethyl ketone peroxide, with a peroxide content of 39–41%, and 0.5% morpholine, as accelerator, films with good characteristics can be cast.

Example 20

Twenty (20) parts of thiosemicarbazide are dissolved in 800 parts of acrolein and 160 parts of allyl glycidyl ether and 80 parts of butylene glycol are added to the resulting solution. Also, in this case, the temperature rises to 60° C. and is held at this temperature for another hour. Then the reaction mass is cooled and 200 parts of diallyl phthalate are added. By the addition of peroxides with or without accelerator film coatings are obtained which dry well.

Example 21

A solution of 2 parts of thiourea in 160 parts of acrolein is mixed and reacted with 32 parts of allyl glycidyl ether and 16 parts of butinediol. By cooling, the temperature is held for 4 hours at 20° C. Then, the syrupy resin is mixed with 100 parts of methanol and left standing overnight. Thereafter the alcohol is distilled off under a vacuum and 50 parts of styrene are added. The clear, viscous resin solution, after addition of 2% cyclohexanone paste and 1% cobaltnaphthenate gives a fast drying light and very good adhering films with an excellent elasticity.

Example 22

Eighty (80) parts of an epoxy resin derived from p,p'-dihydroxydiphenyldimethylmethane and epichlorohydrin in alkaline solution and having a molecular weight of 328, a melting point of 8–12° C., and an epoxy equivalent of 175–210 and 5 parts of thiourea are dissolved in 400 parts of acrolein. The temperature rises slowly and the mixture becomes more viscous. After about 2 hours, 150 parts of styrene and 50 parts of diallyl phthalate are added to this solution. In this instance, the addition of ethanol becomes necessary to prevent gelatinizing of the resin. Also from this resin, after addition of a peroxide catalyst, cold hardening lacquer coatings are provided.

Example 23

Four hundred (400) parts of acrolein, 10 parts of thiourea, 80 parts of xylenyl glycidyl ether and 40 parts of acrylonitrile are mixed together and the temperature held to 40° C. for 3 hours. After an addition of 200 parts styrene, lacquer coatings, as described in the following examples, are provided with good coating characteristics.

Example 24

A solution of 300 parts of acrolein, 2.5 parts of thiourea and 30 parts of allyl glycidyl ether are mixed and reacted in the apparatus described in Example 18. The temperature rises to 50° C. within 1 hour. Then 25 parts of the trimethylolpropane ester of adipic acid are added. A fall in temperature to 30° C. takes place. Then, again, 2.5 parts of thiourea are added whereupon the temperature rises within 1 hour to 60° C. At this time, a solution of 100 parts of styrene and 100 parts of methanol is added and the resulting mass is stirred for another 2 hours at 30° C. (In the place of styrene, for instance, vinyl acetate, acrylonitrile or acryl acid esters can also be used.) After the two hour interval, a major part of the alcohol is distilled off under a vacuum whereby simultaneously traces of unconverted acrolein are converted. In all cases, regardless of the designated vinyl compounds added, the resin solutions thus obtained, after addition of peroxides, for instance 2% cyclohexanone peroxide (50%) and an accelerator, for instance 2% cobaltnaphthenate (1% cobalt), fast-drying and well adhering lacquer coatings are obtained. Even without accelerator, the films dry fast but a thorough drying of the resin takes a longer period of time.

*Example 25*

Two and five-tenths (2.5) parts of thiourea are dissolved in 200 parts of acrolein and 40 parts of allyl glycidyl ether and 20 parts of hexanetriol are added thereto. In exothermic reaction, a rise in temperature to 50° C. takes place in 3 hours. At this temperature, 150 parts of styrene and 50 parts of methanol are dripped into the reaction mass which is cooled to 30° C. and stirred at this temperature for about another 3 hours. Then the major part of the methanol added is distilled off. From the resulting resin solution of medium viscosity films with good characteristics can be provided, as described in the previous example.

*Example 26*

Two and five-tenths (2.5) parts of thiourea are dissolved in 100 parts of acrolein. Then the clear solution is mixed with 20 parts of butanediol diglycidyl ether and with 25 parts of maleic acid trimethylol propane ester. The reaction product is obtained in about 24 hours as a clear resin with approximately the same characteristics as the resin described in Example 3.

*Example 27*

Forty (40) parts of an epoxy resin having a molecular weight of 400 and an epoxy equivalent of 210–220 as obtained, in a known manner, from butanediol and epichlorohydrin are added to a solution of two (2) parts of thiourea in 100 parts of acrolein. The temperature rises to 45° within 100 minutes. As soon as the mixture of the reaction becomes viscous it is diluted with a mixture from toluene, ethanol and ethylene glycol monoethyl ether (7:3:1). The resin solution is stable in storage and can be used as lacquer.

*Example 28*

Hundred (100) parts of acrolein are mixed with 2 parts of thiourea and 20 parts of an epoxy resin derived from p,p'-dihydroxydiphenyldimethylmethane and epichlorohydrin in alkaline solution and having a molecular weight of 328, a melting point of 8–12° C., and an epoxy equivalent of 175–210, and 20 parts of an aliphatic polyglycidyl ether, having a molecular weight of 400 and an epoxy equivalent of 210–220. The epoxy resins are completely dissolved in the acrolein. After a short period of time while stirring the temperature rises to about 40° C. Stirring for another two hours at this temperature is continued, then 100 parts of a mixture of toluene and acetic ester of ethylene glycol monoethyl ether (3:1) are added, stirring for another five hours. the resulting product is mixed with 50 parts of alcohol. To remove small traces of unreacted acrolein it is appropriate to distill off the added alcohol under a partial vacuum. The resin solution is stable in storage and can be used as lacquer.

It is apparent from the foregoing disclosure that "epoxy compound" is used herein to indicate compounds having an oxirane oxygen atom, i.e. epoxy groups of the following configuration:

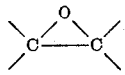

and the specification and claims should be read with this understanding.

The various examples are included solely as representative embodiments of my invention for it will be apparent that the reactants disclosed in the examples, their reaction proportions, and the conditions under which they are reacted may be widely varied and yet fall within the scope of the invention as taught herein and as defined in the appended claims.

What is claimed is:

1. A process for the production of hardenable acrolein copolymers which comprises exothermically copolymerizing (1) acrolein with (2) an epoxy compound containing a plurality of epoxy groups selected from the group consisting of aliphatic ethers, an epoxy resin obtained from a polyhydric phenol and a halogen hydrin and an epoxy resin obtained from a polyhydric aliphatic alcohol and a halogen hydrin in intimate admixture with (3) a catalyst selected from the group consisting of a thiourea, a thioamide and thiosemicarbazide so that a polyadditive polymerization takes place by an opening-up of epoxy groups.

2. A process for the production of hardenable acrolein copolymers which comprises exothermically copolymerizing (1) acrolein with (2) an epoxy resin containing a plurality of epoxy groups derived from bisphenol and epichlorohydrin in intimate admixture with (3) a catalyst selected from the group consisting of a thiourea, a thioamide and thiosemicarbazide so that a polyadditive polymerization takes place by an opening-up of epoxy groups.

3. A copolymer resin produced by the process of claim 2.

4. A process for the production of hardenable acrolein copolymers which comprises exothermically copolymerizing (1) acrolein with (2) an epoxy resin containing a plurality of epoxy groups derived from dihydric aliphatic alcohol and epichlorohydrin in intimate admixture with (3) a catalyst selected from the group consisting of a thiourea, a thioamide and thiosemicarbazide so that a polyadditive polymerization takes place by an opening-up of epoxy groups.

5. A copolymer resin produced by the process of claim 4.

6. A process for the production of hardenable acrolein copolymers which comprises exothermically copolymerizing (1) acrolein with (2) an aliphatic diglycidyl ether in intimate admixture with (3) a catalyst selected from the group consisting of a thiourea, a thioamide and thiosemicarbazide so that a polyadditive polymerization takes place by an opening-up of epoxy groups.

7. A copolymer resin produced by the process of claim 6.

8. A process for the production of hardenable acrolein terpolymers which comprises exothermically polymerizing (1) acrolein with (2) an epoxy compound containing a plurality of epoxy groups selected from the group consisting of aliphatic ethers, an epoxy resin obtained from a polyhydric phenol and a halogen hydrin and an epoxy resin obtained from a polyhydric aliphatic alcohol and a halogen hydrin and with (3) a polyhydric compound containing two terminal hydroxy groups selected from the group consisting of aliphatic alcohols, aliphatic ether alcohols, esters of polyhydric aliphatic alcohol with polybasic acids, polyhydric phenols, and ethers of polyhydric aliphatic alcohols with polyhydric phenols in intimate admixture with (4) a catalyst selected from the group consisting of a thiourea, a thioamide and thiosemicarbazide so that a polyadditive polymerization takes place by an opening-up of epoxy groups.

9. A terpolymer resin produced by the process of claim 8.

10. A process for the production of hardenable acrolein terpolymers which comprises exothermically polymerizing (1) acrolein with (2) an epoxy compound containing a plurality of epoxy groups selected from the group consisting of aliphatic ethers, an epoxy resin obtained from a polyhydric phenol and a halogen hydrin and an epoxy resin obtained from a polyhydric aliphatic alcohol and a halogen hydrin and with (3) a polymerizable vinyl monomer in intimate admixture with (4) a catalyst selected from the group consisting of a thiourea, a thioamide and thiosemicarbazide so that a polyadditive polymerization takes place by an opening-up of epoxy groups.

11. A terpolymer resin produced by the process of claim 10.

12. A process for the production of hardenable acrolein tetrapolymers which comprises exothermically polymerizing (1) acrolein with (2) an epoxy compound containing a plurality of epoxy groups selected from the group consisting of aliphatic ethers, an epoxy resin obtained from a polyhydric phenol and a halogen hydrin and an epoxy resin obtained from a polyhydric aliphatic alcohol and a halogen hydrin and with (3) a polyhydric compound containing two terminal hydroxy groups selected from the group consisting of aliphatic alcohols, aliphatic ether alcohols, esters of polyhydric aliphatic alcohols with polybasic acids, polyhydric phenols, and ethers of polyhydric aliphatic alcohols with polyhydric phenols and with (4) a polymerizable vinyl monomer in intimate admixture with (5) a catalyst selected from the group consisting of a thiourea, a thioamide and thiosemicarbazide so that a polyadditive polymerization takes place by an opening-up of epoxy groups.

13. A tetrapolymer resin produced by the process of claim 12.

References Cited in the file of this patent
UNITED STATES PATENTS

| | | |
|---|---|---|
| 2,676,166 | Webers | Apr. 20, 1954 |
| 2,687,404 | Robertson | Aug. 24, 1954 |
| 2,895,945 | Fischer et al. | July 21, 1959 |

FOREIGN PATENTS

| | | |
|---|---|---|
| 748,690 | Germany | Nov. 8, 1944 |